UNITED STATES PATENT OFFICE.

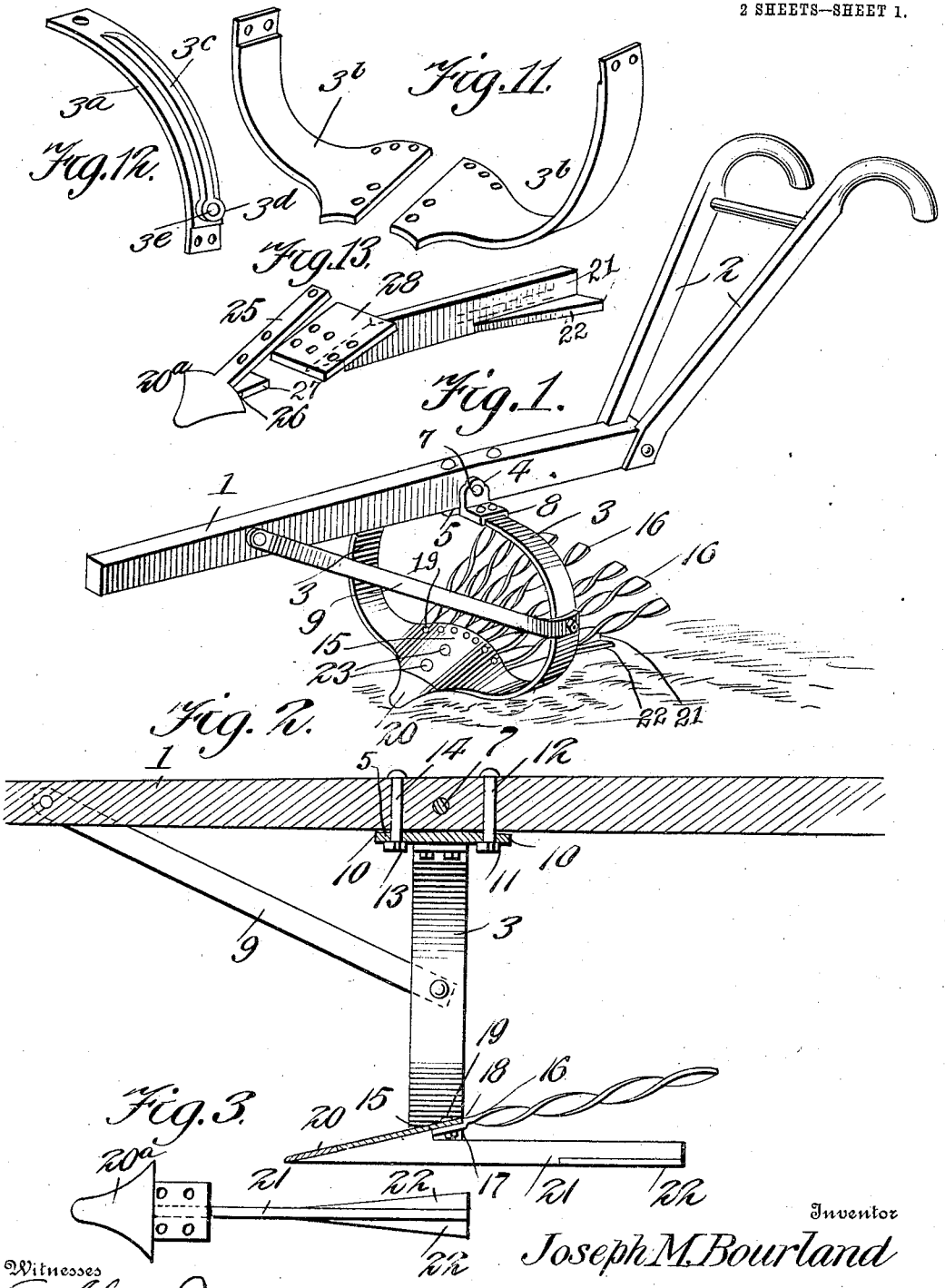

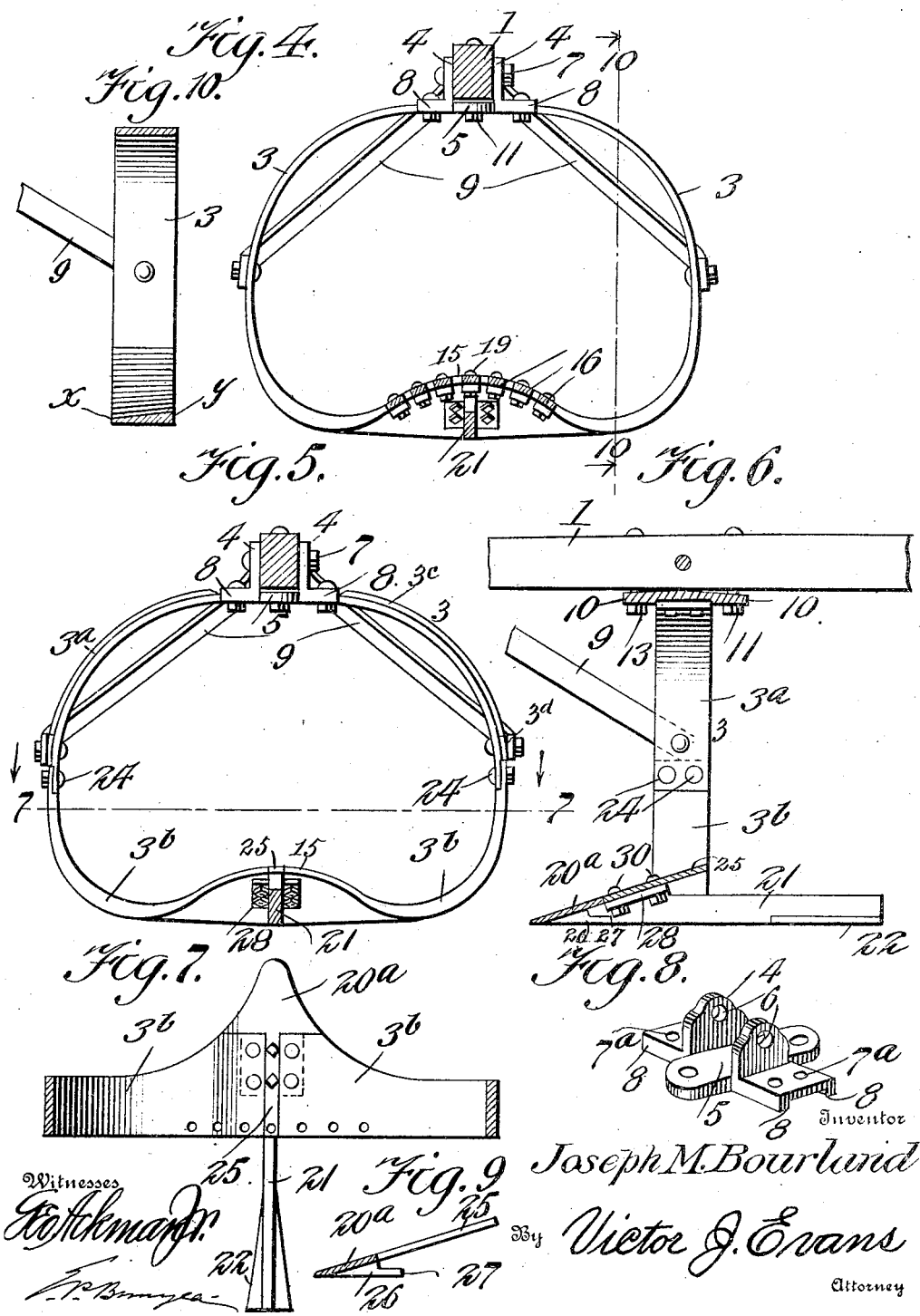

JOSEPH M. BOURLAND, OF BEAUMONT, TEXAS.

ROOT-CROP HARVESTER.

No. 914,232.　　　　Specification of Letters Patent.　　Patented March 2, 1909.

Application filed July 23, 1908. Serial No. 444,987.

*To all whom it may concern:*

Be it known that I, JOSEPH M. BOURLAND, a citizen of the United States of America, residing at Beaumont, in the county of Jefferson and State of Texas, have invented new and useful Improvements in Root-Crop Harvesters, of which the following is a specification.

This invention relates to root-crop harvesters designed more particularly for digging peanuts and potatoes, but capable of many other uses, such as digging sugar beets, turnips, onions, small nursery stock and all other root-crops.

One of the principal objects of the invention is to provide an implement of light weight, thoroughly braced to give it great strength, of simple construction and which will not be provided with a central standard or other obstruction to catch the vines and weeds and impede the progress of the plow.

Still another object of the invention is to provide a device of the character described which will not turn a furrow slice and which will not pitch the dirt to the right or to the left nor turn it over, but which will lift gently a slice of soil, raise it upward on an inclined plane and sift out the crop from the soil.

Another object of the invention is to provide a simple implement for uprooting cotton and corn stubble and to destroy the winter quarters of insect pests.

These and other objects may be attained by means of the construction illustrated in the accompanying drawings, in which,—

Figure 1 is a perspective view of an implement made in accordance with my invention. Fig. 2 is a longitudinal section of the same on an enlarged scale. Fig. 3 is a plan view of the combined plow point and land shoe. Fig. 4 is a vertical sectional view of the implement. Fig. 5 is a similar view of a modified form of supporting frame. Fig. 6 is a longitudinal section of the same. Fig. 7 is a horizontal section on the line 7—7 of Fig. 5, looking downward, showing the combined plow point and land shoe in place. Fig. 8 is a perspective view of the casting which secures the digger frame to the beam of the plow. Fig. 9 is a sectional view of a modified form of point and shoe. Fig. 10 is a sectional view on the line 10—10 of Fig. 4, looking in the direction indicated by the arrows therein. Fig. 11 is a perspective view of the two supporting bars, as shown in the modified form, Fig. 5. Fig. 12 is a perspective view of the upper member of the supporting bars, as shown in said Fig. 5. Fig. 13 is a perspective view of the combined plow point and land shoe, as shown in Fig. 7.

Referring to the drawing for a more specific description of my invention, the numeral 1 designates the beam and 2 the handle, these parts being of the usual or any suitable construction. Secured under the beam is a substantially circular supporting frame 3, which, as shown in Figs. 1, 2 and 4, is formed of a single piece of plow-share steel, the upper ends of which are secured to a casting comprising upright lugs 4 which are spaced apart in width sufficiently to permit the beam to rest between them upon the base portion 5 of the casting. The lugs 4 are provided with registering apertures 6 to accommodate a bolt 7 which passes through the lugs and through the beam 1. The upper ends of the circular frame 3 are secured by means of bolts passing through apertures 7ª in the outwardly extending portions of the casting, said outwardly projecting portions having downwardly extending oppositely disposed flanges 8, all as shown more particularly in Fig. 8 of the drawing. Forwardly extending braces 9 are secured at their outer ends to the beam and at their other ends to the supporting frame 3 at a point nearly midway between the beam and the ground. It is to be noted that the base portion 5 of the beam casting has its upper face slightly beveled off toward its opposite ends, as shown at 10 in Figs. 2 and 6. The result of this construction is that when the nut 11 of the bolt 12 is loosened and the nut 13 on the bolt 14 is tightened, that the plow point is slightly raised to adjust the point to take the required depth into the soil. When the nut 11 is tightened up so that the upper face of the base portion 5 fits closely against the underside of the beam, and the nut 13 is turned partially off the bolt 14 the plow point will take a deeper bite.

The lower portion of the ring-like supporting frame 3 is slightly curved upwardly, as at 15, and connected to the rear edge of this curved portion are the radially extending spiral fingers 16. At the opposite sides of the upwardly curved portion 15 the metal is sharpened off on the front edge, as at $x$, while at the rear edge the metal is thickened, as at $y$, Fig. 10. The result of this construction is that the ring-like frame cuts its way through the soil at the proper depth and permits it to pass through the frame and on to the spiral fingers, where the crop is sifted out and deposited on top of the soil. These fingers may be bent downwardly at their forward ends, as at 17, forming a shoulder 18 which bears against the rear edge of the frame 3, and when each finger is secured in place by means of a single bolt 19 the shoulder 18 serves to prevent lateral movement of the fingers. These fingers may be quickly made from flat sheet metal blanks properly twisted to form spirally disposed blades and which will serve to thoroughly agitate soft soil as it passes over the same and sift or screen the crops from the soil. These fingers may be varied as to width and length for various purposes, and for some uses a smaller number of wider fingers will give more satisfaction. For sugar beets and for some other purposes the fingers may be round but bent into spiral form. A plow point 20 is connected to the frame 3 and serves to start the implement into the ground.

The combined point and land shoe consists of a triangular point $20^a$ having an integral land shoe 21 extending backwardly therefrom, said land shoe at the heel end thereof having fins or lateral projections 22. The point and land shoe are secured underneath the curved portion 15 of the supporting frame 3 by suitable bolts or rivets 23.

The ring-like supporting frame 3 may be made of several parts or sections, as shown in Figs. 5, 6, 11 and 12, the upper section $3^a$ being secured to the lower sections $3^b$ by rabbeting the ends of said sections and passing bolts 24 through the rabbeted ends. The upper sections $3^a$ are each provided with a central longitudinal rib $3^c$, said rib having a boss $3^d$ having an aperture $3^e$ therein for the bolt which secures the brace 9 to the frame.

Instead of the point and land shoe being made of a single piece they may be made as shown in Figs. 5, 6, 7, 9 and 13 with an upwardly extending shank 25 and a lug 26 extending backwardly, as shown in Fig. 13. The body portion of the land shoe may be similar to that already described, and at the front end of the heel portion a plate 28 is provided which fits over the lug 26 and underneath the shank 25. The plate 28 is secured by bolts 30 to the inclined portion of the frame sections $3^b$.

From the foregoing it will be obvious that my invention while of simple construction and of light weight and draft is durable and efficient for its purpose.

Having thus described the invention, what is claimed as new, is:—

1. In an implement of the character described, a beam, a circular frame secured to the beam, said frame having an upwardly curved lower portion, a point and land shoe secured to said frame, and a series of radially disposed backwardly and upwardly extending twisted fingers.

2. In an implement of the character described, a beam, a casting secured to the beam and provided with a base portion having oppositely beveled ends, a frame secured to said casting, a plow point connected to said frame, and bolts for securing said base portion to the beam to adjust the depth of said plow point.

3. In an implement of the character described, a ring-like supporting frame, a plow point and land shoe secured thereto, a casting for securing said frame to the beam, said casting having an oppositely beveled face, bolts extending through the beam and through the oppositely beveled portions of the casting, whereby the point of the plow may be adjusted for a greater or a less depth of cut.

4. In an implement of the character described, the combination of a beam, a circular supporting frame secured underneath said beam, said supporting frame having an upwardly curved lower portion, a plow point secured to said curved portion, and a land shoe secured to said curved portion, said land shoe having oppositely disposed wings.

In testimony whereof I affix my signature in presence of two witnesses.

JOSEPH M. BOURLAND.

Witnesses:
B. F. Cox,
C. C. Haralson.